United States Patent
Shiozaki et al.

(10) Patent No.: US 12,305,246 B2
(45) Date of Patent: May 20, 2025

(54) NEEDLE-PEENING METHOD

(71) Applicant: JFE Steel Corporation, Tokyo (JP)

(72) Inventors: Tsuyoshi Shiozaki, Tokyo (JP); Naoki Yamaguchi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 440 days.

(21) Appl. No.: 17/436,272

(22) PCT Filed: Nov. 7, 2019

(86) PCT No.: PCT/JP2019/043633
§ 371 (c)(1),
(2) Date: Sep. 3, 2021

(87) PCT Pub. No.: WO2020/183783
PCT Pub. Date: Jul. 17, 2020

(65) Prior Publication Data
US 2022/0177988 A1    Jun. 9, 2022

(30) Foreign Application Priority Data
Mar. 8, 2019    (JP) .................................. 2019-042366

(51) Int. Cl.
*C21D 7/06*    (2006.01)
(52) U.S. Cl.
CPC ..................... *C21D 7/06* (2013.01)
(58) Field of Classification Search
CPC .... B21D 31/06; B21D 35/008; B24B 39/006; C21D 7/06; C21D 7/04; B23P 9/04
(Continued)

(56) References Cited

U.S. PATENT DOCUMENTS 7,276,824 B2 * 10/2007 Statnikov ................. C21D 7/04
310/26
7,754,033 B2 * 7/2010 Ishikawa ................... C21D 7/04
148/558
(Continued)

FOREIGN PATENT DOCUMENTS

CN    1703300 A    11/2005
CN    103958116 A    7/2014
(Continued)

OTHER PUBLICATIONS

KR 20130076241A, Lee Jul. 2013.*
(Continued)

*Primary Examiner* — Edward T Tolan
(74) *Attorney, Agent, or Firm* — DLA Piper LLP (US)

(57) ABSTRACT

A needle-peening method of peening a weld toe of a welded joint for welding and joining two pieces of sheet metal using a peening pin includes vibrating one or a plurality of the peening pins in a center axis direction; rotating the one peening pin about a single rotation axis parallel to the center axis while the center axis of the one peening pin is offset from the rotation axis, when using the one peening pin; rotating the plurality of the peening pins about the rotation axis, when using the plurality of the peening pins; and moving the one or plurality of the peening pins along the welding direction to peen the weld toe, wherein a radius of curvature of a cross section perpendicular to a welding direction at a distal end part of the peening pin is equal to or larger than 0.05 mm and smaller than 1.00 mm.

5 Claims, 7 Drawing Sheets

(58) Field of Classification Search
USPC .......................................................... 72/710
See application file for complete search history.

(56) References Cited

U.S. PATENT DOCUMENTS

| | | | | |
|---|---|---|---|---|
| 8,033,151 | B2* | 10/2011 | Castle | B21D 31/06 |
| | | | | 72/429 |
| 8,776,564 | B2* | 7/2014 | Shimanuki | C21D 9/50 |
| | | | | 72/75 |
| 9,605,328 | B2* | 3/2017 | Sharman | B23K 33/00 |
| 9,889,488 | B2* | 2/2018 | Kozaki | B21D 31/06 |
| 10,105,815 | B2* | 10/2018 | Guo | C21D 7/04 |
| 11,298,740 | B2* | 4/2022 | Wilkosz | B21D 31/005 |
| 11,633,811 | B2* | 4/2023 | Yamaguchi | B23K 31/00 |
| | | | | 148/558 |
| 2002/0014100 | A1* | 2/2002 | Prokopenko | B24B 1/04 |
| | | | | 72/53 |
| 2007/0134059 | A1 | 6/2007 | Nakashima et al. | |
| 2011/0107571 | A1 | 5/2011 | Kerdiles et al. | |
| 2014/0169863 | A1 | 6/2014 | Sharman et al. | |
| 2015/0258596 | A1 | 9/2015 | Kozaki et al. | |
| 2020/0269358 | A1* | 8/2020 | Yamaguchi | B32B 15/011 |

FOREIGN PATENT DOCUMENTS

| | | |
|---|---|---|
| CN | 108239734 A | 7/2018 |
| JP | 3002229 B2 | 11/1999 |
| JP | 2001-179632 A | 7/2001 |
| JP | 2004-169103 A | 6/2004 |
| JP | 2006-167724 A | 6/2006 |
| JP | 2008-000802 A | 1/2008 |
| JP | 4837428 B2 | 10/2011 |
| JP | 4952856 B1 | 6/2012 |
| JP | 2013-071140 A | 4/2013 |
| JP | 2014-008507 A | 1/2014 |
| JP | 6138450 B2 | 5/2017 |
| JP | 2017-094396 A | 6/2017 |
| WO | 2011/092831 A1 | 8/2011 |
| WO | 2012/140920 A1 | 10/2012 |

OTHER PUBLICATIONS

JP 2007-283355A, Nose et al. Nov. 2007.*
JP 2012-11462A, Morikage et al. Jan. 2012.*
JP 2017-94396A, Suzuki et al. Jun. 2017.*
JP 2013-169580A, Shimanuki et al. Sep. 2013.*
JP 2004-169099A, Tominaga et al. Jun. 2004.*
CN 105643186A, Yu et al. Jun. 2016.*
WO 2004/046398A1, Tominaga et al. Jun. 2004.*
Office Action dated Mar. 20, 2023, of counterpart Korean Patent Application No. 10-2021-7027115, along with a Concise Statement of Relevance of Office Action in English.
Extended European Search Report dated Mar. 18, 2022, of counterpart European Patent Application No. 19918827.7.
Examination Report dated Mar. 30, 2022, of counterpart Indian Patent Application No. 202117040513.
Office Action dated Apr. 27, 2022, of counterpart Chinese Patent Application No. 201980093752.8, along with a partial English translation.

* cited by examiner

NEEDLE-PEENING METHOD

TECHNICAL FIELD

This disclosure relates to a needle-peening method and, specifically, a needle-peening method of peening a weld toe of a welded joint for welding sheet metal.

BACKGROUND

Typically, in most of automotive suspension parts, steel parts made of steel sheets are joined with each other by a welded joint. A load is repeatedly applied to the suspension part when an automobile is driving so that fatigue may be caused in the suspension part. It is known that such fatigue tends to be caused at a weld, and most of the fatigue is a fracture mode caused by a crack parallel to a welding direction. The fracture mode is a fracture mode caused by a bending moment load in a direction parallel to the welding direction, that is, a stress perpendicular to the welding direction. Fatigue properties of the weld cannot be improved by high-strengthening of base metal, but is effectively compensated by increasing the thickness. Thus, the fatigue properties hinder reducing the wall thickness of the steel parts used for the suspension part. Accordingly, for the purpose of reducing the wall thickness, various techniques have been implemented to improve the fatigue properties of the weld.

Most of the fatigue is caused at a weld toe of the weld, and it is known that a main cause of the fatigue is stress concentration on the weld toe and a tensile residual stress caused by welding. To solve this problem, as a method of relieving stress concentration by deforming the shape of the weld toe, and giving a compressive residual stress by plastic deformation at the same time, there has been implemented needle-peening processing of peening the weld toe by a vibrating hammer tip or peening pin (Japanese Patent No. 3002229 and Japanese Patent Application Laid-open No. 2014-008507). However, in the methods disclosed in JP '229 and JP '507, a distal end radius of the hammer tip or a radius of curvature of a distal end of the peening pin is too large compared to a radius of curvature of the weld toe (weld extra-banking toe) so that there has been the problem that overlapping defects are caused at the weld toe due to a plastic flow of a material to be peened, fatigue is caused from the overlapping defects at the weld toe as a starting point, and the fatigue properties are not sufficiently improved.

Thus, Japanese Patent No. 4837428 discloses a needle-peening method of using a pin having a distal end radius equal to or larger than 1.0 mm and equal to or smaller than 2.0 mm to prevent overlapping defects from being caused when a plastic flow of metal is caused by impact of the pin. Japanese Patent Application Laid-open No. 2013-71140 discloses a needle-peening method of preventing overlapping defects at the weld toe based on a relation between a shape of a welding metal part and a distal end radius of a vibration pin. Additionally, there is disclosed a method of grinding the weld toe by using a grinder as preprocessing.

Furthermore, to further increase the compressive residual stress introduced by needle-peening, Japanese Patent Application Laid-open No. 2006-167724 discloses a method of performing peening processing by a plurality of fixed pins that are arranged at intervals to be parallel with each other and have a predetermined angle with respect to a welding direction so that bulging edges of peening marks formed by needle-peening overlap with each other.

Figure 10:
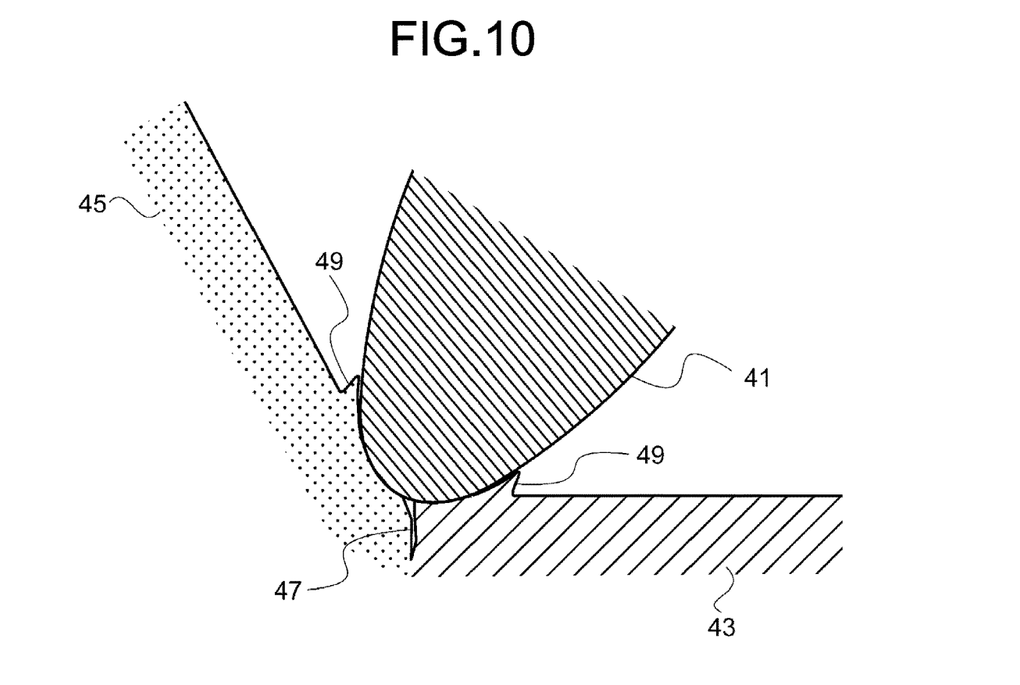
FIG. 10 is a diagram explaining a problem of a conventional needle-peening method.
Figure 11A:
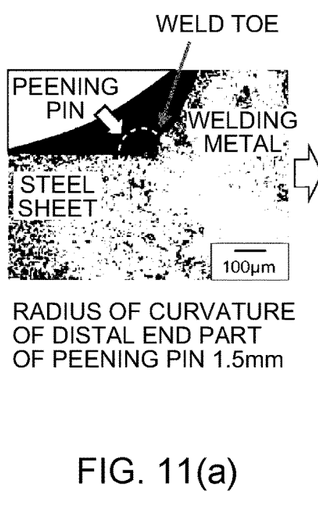
Figure 11B:
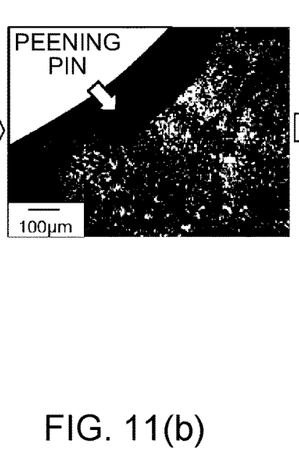
Figure 11C:
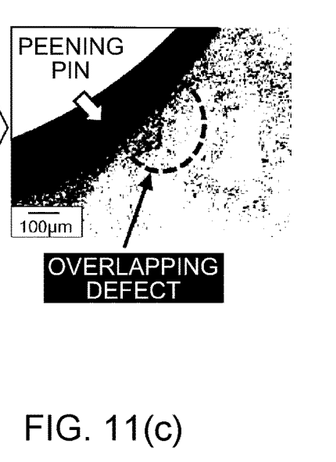

Most of automotive suspension parts are obtained by joining steel sheets having a thickness equal to or larger than 0.8 mm and equal to or smaller than 3.5 mm as base metal by a welded joint, and a radius of curvature of a weld toe of such a welded joint for steel sheets is about 0.2 mm to 1.0 mm. Thus, if the method disclosed in JP '428 is applied to the welded joint for the steel sheets, even when peening is performed by using a peening pin having a distal end radius of 1.0 mm, there has been the high risk that an overlapping defect 47 is caused at the weld toe as illustrated in FIG. 10.

In the method disclosed in JP '140, overlapping defects can be prevented from being caused based on a relational expression between the distal end radius of the peening pin (vibration pin) and a weld toe shape, but a flank angle of the welded joint is required to be equal to or smaller than 15 degrees, the welded joint in which the radius of curvature of the weld toe is 0.3 mm, for example. However, considering that a typical value of the flank angle is about 60 degrees, there has been the problem that the method disclosed in JP '140 cannot be applied to most welded joints made of steel sheets as base metal.

A driving force required to provide pressure for applying plastic deformation is increased as the distal end radius of the peening pin is increased so that, when using a peening pin having a distal end radius equal to or larger than 1.0 mm for a high-strength material, it has been required to use an expensive large device of an air-driving type (JP '507), an ultrasonic type (JP '428, JP '724) or the like. On the other hand, if the distal end radius of the peening pin is small, the overlapping defect 47 at the weld toe as illustrated in FIG. 10 can be prevented from being caused, but an overlapping defect 49 may be caused at a peening mark end in the vicinity of the weld toe, which may become a starting point of fatigue in some instances. Specifically, when the weld toe is peened along the welding direction, the overlapping defect 49 at the peening mark end continuous to the welding direction is formed.

When a load is applied in a direction orthogonal to the overlapping defect 49 at the peening mark end continuous to the welding direction, the overlapping defect 49 is assumed to be a notch continuous to a direction orthogonal to a direction of repeated tensile stress of fatigue. In such a notch, a stress caused at a bottom part of the notch becomes higher than that of a notch continuous to another direction (for example, a direction parallel to a tensile stress direction) so that generation and development of a crack are accelerated. Due to this, there has been the problem that, when the load applied in the direction orthogonal to the welding direction is loaded onto the weld toe, if the overlapping defect 49 at the peening mark end is formed in parallel to the welding direction, fatigue properties are prevented from being improved by peening with the peening pin.

Such a problem is also found in the method disclosed in JP '724 to perform peening processing with a plurality of pins so that bulging edges of peening marks overlap with each other, and there has been the problem that development of a crack cannot be prevented against a stress perpendicular to the welding direction.

It could therefore be helpful to provide a needle-peening method that can relieve stress concentration on the weld toe and can prevent overlapping defects from being caused.

SUMMARY

We thus provide a needle-peening method of peening a weld toe of a welded joint for welding and joining two pieces of sheet metal by using a peening pin, wherein a radius of curvature of a cross section perpendicular to a welding direction at a distal end part of the peening pin is equal to or larger than 0.05 mm and smaller than 1.00 mm, and the method includes: vibrating one or a plurality of the peening pins in a center axis direction; rotating the one peening pin about a single rotation axis parallel to the center axis while the center axis of the one peening pin is offset from the rotation axis, when using the one peening pin; rotating the plurality of the peening pins about the rotation axis, when using the plurality of the peening pins; and moving the one or the plurality of the peening pins along the welding direction to peen the weld toe.

Also, in the needle-peening method, the plurality of the peening pins are arranged in a radial direction centered on the rotation axis.

Moreover, in the needle-peening method, the plurality of the peening pins are arranged in a circumferential direction centered on the rotation axis.

Overlapping defects can be prevented from being caused at a weld toe, a welding ripple at the weld toe can be flattened, and fatigue properties of a welded joint can be improved.

BRIEF DESCRIPTION OF THE DRAWINGS

FIGS. 5 (a)-(c) are diagrams illustrating an arrangement of peening pins in the needle-peening method according to the example (part 1).

FIGS. 6 (a) and (b) are diagrams illustrating an arrangement of the peening pins in the needle-peening method according to the example (part 2).

FIGS. 11 (a)-(c) are diagrams explaining an overlapping defect caused by a conventional needle-peening method.

REFERENCE SIGNS LIST

1 PEENING PIN
1a DISTAL END PART
11 WELDED JOINT
13, 15 SHEET METAL
17 WELD BEAD
19 WELD TOE
21 WELDED JOINT (EXAMPLE)
23, 25 STEEL SHEET
27 WELD BEAD
29 WELD TOE
31 JIG
33 POSITIONING PIN HOLE
41 PEENING PIN
43 STEEL SHEET
45 WELDING METAL
47 OVERLAPPING DEFECT AT WELD TOE
49 OVERLAPPING DEFECT AT PEENING MARK END

DETAILED DESCRIPTION

Conventionally, it has been considered that, when a radius of curvature of a weld toe is small, that is, 1.0 mm or less, stress concentration is difficult to be sufficiently relieved due to a sharp shape thereof. Thus, it has been considered that a radius of curvature of a cross section perpendicular to a welding direction of a distal end part of the peening pin needs to be increased to some degree, for example, to be equal to or larger than the radius of curvature of the weld toe to relieve stress concentration by peening the weld toe with a peening pin. However, there has been the risk that, if the weld toe is peened by a peening pin having a larger radius of curvature than that of the weld toe, an overlapping defect 47 at the weld toe may be caused by a plastic flow of a material as illustrated in FIGS. 10 and 11(a)-(c).

On the other hand, if the weld toe is peened along the welding direction by using a peening pin having a smaller radius of curvature than the radius of curvature of the weld toe, as illustrated in FIG. 10, there have been instances when overlapping defects 49 at peening mark ends are continuously formed in the vicinity of the weld toe, and fatigue properties are deteriorated due to the overlapping defects 49.

Thus, as a result of examining a cause of fatigue of the welded joint again in detail, we found that the fatigue properties are deteriorated by a minute projection and depression, which is called a "welding ripple," having a size equal to or smaller than 0.05 mm generated at the weld toe at the time of welding. Specifically, we found that a high-strength material having a tensile strength of 780 MPa grade or more is largely influenced by lowering of fatigue strength due to stress concentration on the weld toe so that an effect of improving the fatigue properties is increased by relieving the stress concentration.

Thus, we sought a method of relieving the shape of the weld toe without causing overlapping defects for the weld toe having a radius of curvature equal to or smaller than 1.0 mm, and flattening the welding ripple at the weld toe in peening the weld toe by the peening pin.

As a result, we found that, by peening the weld toe along the welding direction while rotating the peening pin having a radius of curvature smaller than the radius of curvature of the weld toe about a rotation axis offset from a center axis of the peening pin, the welding ripple at the weld toe can be flattened while preventing both of overlapping defects at the weld toe and overlapping defects at the peening mark end from being caused, and fatigue properties and productivity can be sufficiently improved.

The following describes a needle-peening method according to an example based on FIGS. 1 to 6 by exemplifying a lap fillet welded joint. Elements having substantially the same function or configuration are denoted by the same reference numeral, and redundant description will not be repeated. In the drawings used in the following description, a characteristic portion may be enlarged for convenience sake to clarify the characteristic in some instances, but dimensions of or ratios between constituent elements are not necessarily the same as real dimensions or ratios.

Figure 1:
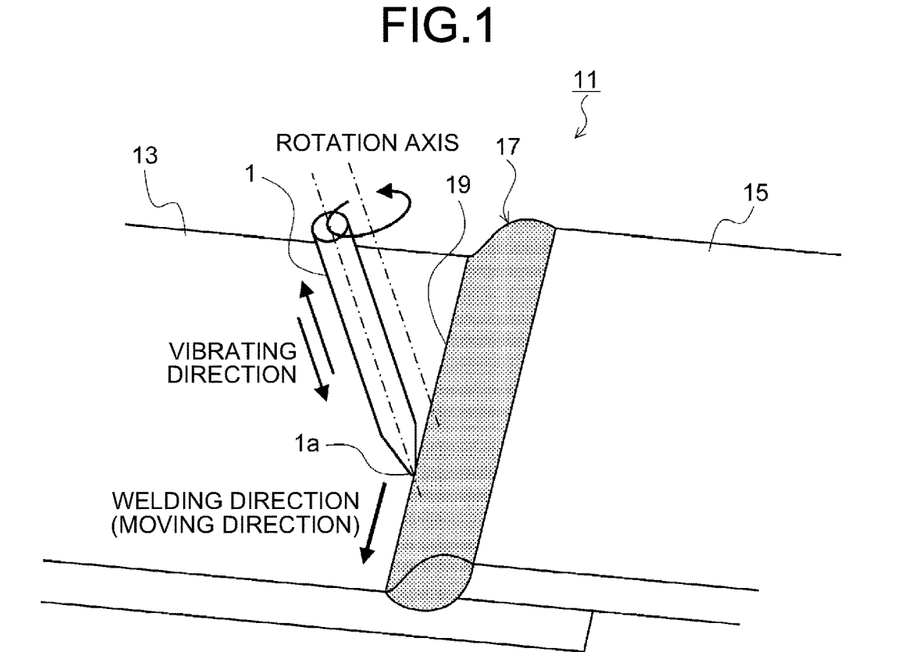
FIG. 1 is a diagram for explaining a needle-peening method according to an example.

Our needle-peening method in this example is performed, as illustrated in FIG. 1 by way of example, by peening a weld toe 19 of a weld bead 17 in a welded joint 11 for welding and joining two pieces of sheet metal 13 and 15 by using a peening pin 1, and peening the weld toe 19 by vibrating the one peening pin 1 in a center axis direction, and moving the peening pin 1 along a welding direction while rotating the peening pin 1 about a rotation axis that is parallel to and offset from the center axis.

At a distal end part 1a of the peening pin 1, a radius of curvature of a cross section perpendicular to the welding direction is equal to or larger than 0.05 mm and smaller than 1.00 mm. By setting the radius of curvature of the distal end part 1a in this range, a shape of minute projection and depression of the weld toe 19 can be relieved without being influenced by wear of the distal end part 1a caused by peening, and overlapping defects can be prevented from being caused at the weld toe 19 by peening.

In performing peening with the one peening pin 1 as illustrated in FIG. 1, the rotation axis is set to be offset from the center axis of the peening pin 1.

In this way, by rotating the peening pin 1 about the rotation axis offset from the center axis of the peening pin 1, a peening process width is widened to peen and process the entire periphery of the weld toe 19, and the welding ripple at the weld toe 19 can be flattened. Due to this, preprocessing by a grinder and the like as disclosed in JP '140 is not required.

With the peening pin 1 in which the radius of curvature of the distal end part 1a is set to be in the range described above, a plastic deformation region in a thickness direction due to peening is a surface layer of about 0.05 mm of a processed portion of the welded joint 11. Due to this, a strain gradient in the thickness direction becomes large, a local large compressive residual stress is obtained on a surface of the processed portion, and the fatigue strength is improved. Additionally, the plastic deformation region in the thickness direction is shallow, that is, about 0.05 mm so that warping of sheet caused by the needle-peening processing is prevented.

In the related art, a peening pin having a radius of curvature equal to or larger than 1.00 mm has been used, but in our peening pin 1, the distal end part 1a thereof has a small radius of curvature equal to or larger than 0.05 mm and smaller than 1.00 mm. Due to this, a contact area with respect to the processed portion of the welded joint 11 becomes smaller so that it is possible to reduce a peening load applied to the peening pin 1 to generate a pressure to cause plastic deformation of the surface layer of the welded joint 11. Due to this, a tool that performs the peening process can be downsized compared to a conventional air-type peening or ultrasonic-type peening, and workability and productivity can be improved.

Furthermore, the peening process width can be widened by rotating the peening pin about the offset rotation axis so that it is possible to implement construction of securely peening the weld toe even in a welded joint in which a weld bead has an unstable shape or a curved shape. In performing peening while rotating the peening pin, a range of a portion that should be peened is at least about 0.5 mm toward a weld bead side and a base metal side from the weld toe as a center.

As a guideline for setting parameters, assuming that a frequency of peening pin vibration is $f_H$ [1/s], a rotation speed is f [1/s], and a radius of gyration (offset distance) is r [mm], the following relation may be satisfied:

$$0.5/2\pi \leq f/f_H \leq 2.0/2\pi r.$$

Assuming that a moving speed is v [mm/s], the following relation may be satisfied:

$$0.25 f \leq v \leq 2.5 f.$$

As described above, it is possible to easily and remarkably improve the fatigue properties of the welded joint obtained by welding and joining high-strength materials. An effect obtained can be sufficiently given to automotive parts that are required to reduce the thickness and improve the fatigue properties.

In the above description, peening is performed while rotating the one peening pin 1. As other aspects of our methods, as exemplified in FIGS. 2 to 4, a plurality of the peening pins 1 may be vibrated in the center axis direction, and the peening pins 1 may be moved along the welding direction while being rotated about one rotation axis parallel to the center axis to peen the weld toe 19 of the weld bead 17.

Figure 2:
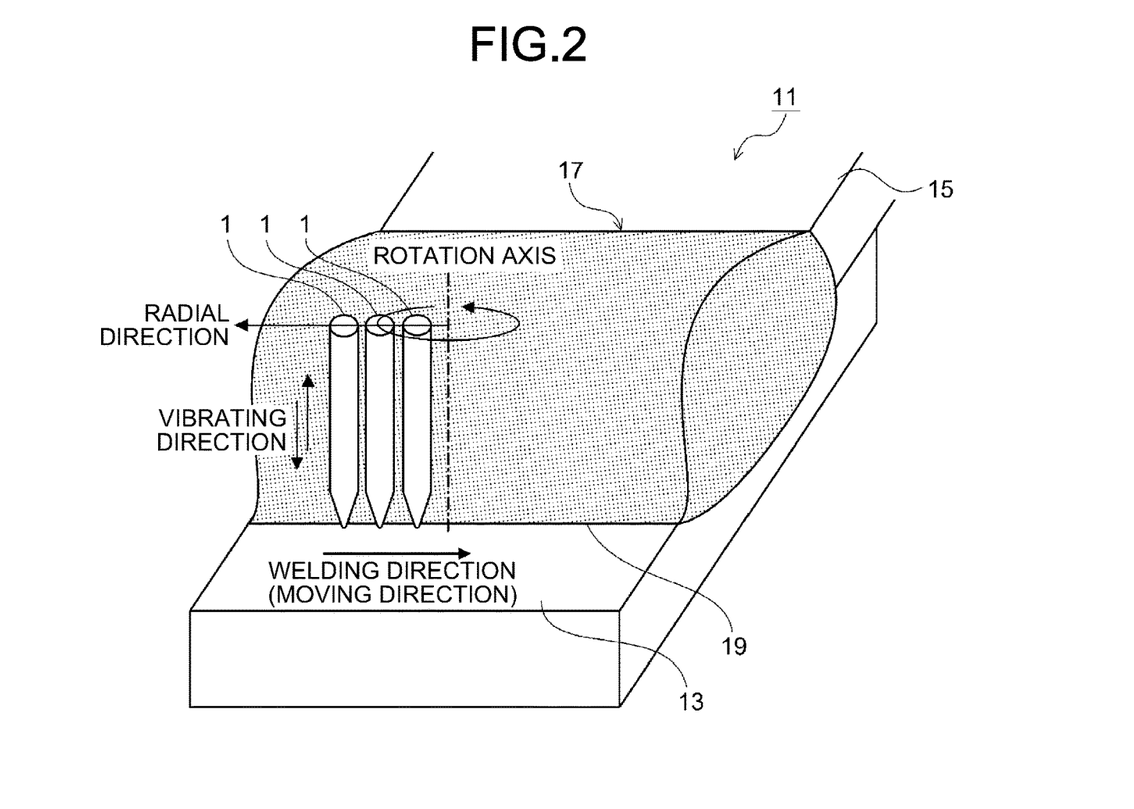
FIG. 2 is a diagram explaining another aspect of the needle-peening method according to the example (part 1).
Figure 3:
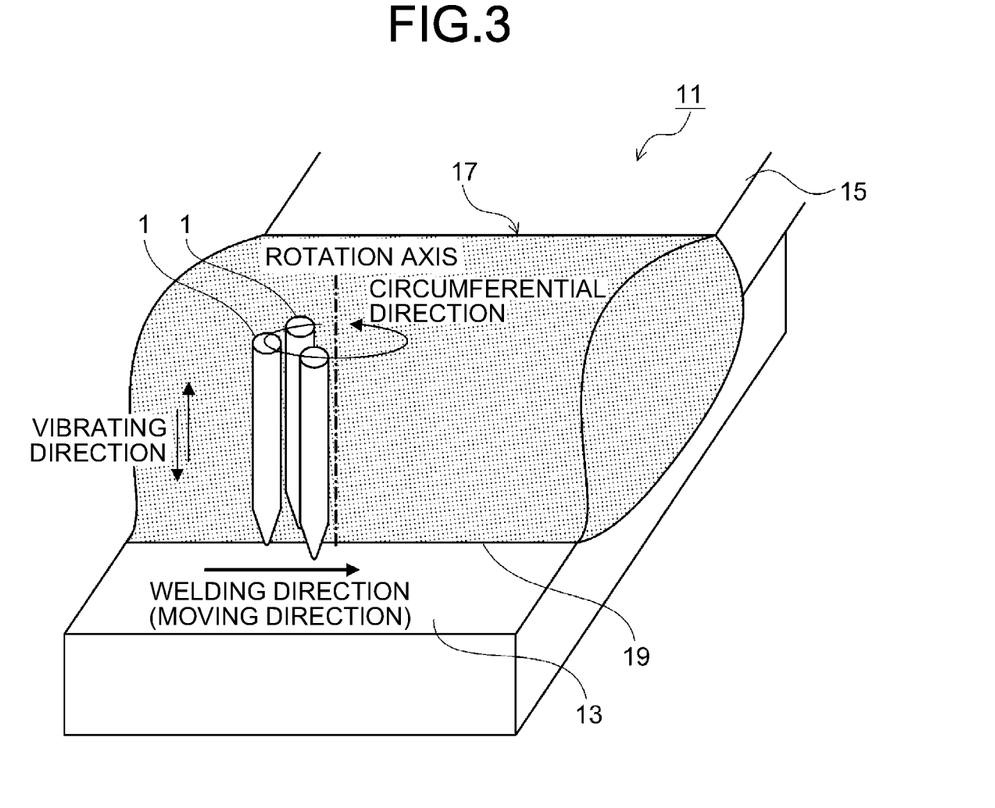
FIG. 3 is a diagram explaining another aspect of the needle-peening method according to the example (part 2).
Figure 4:
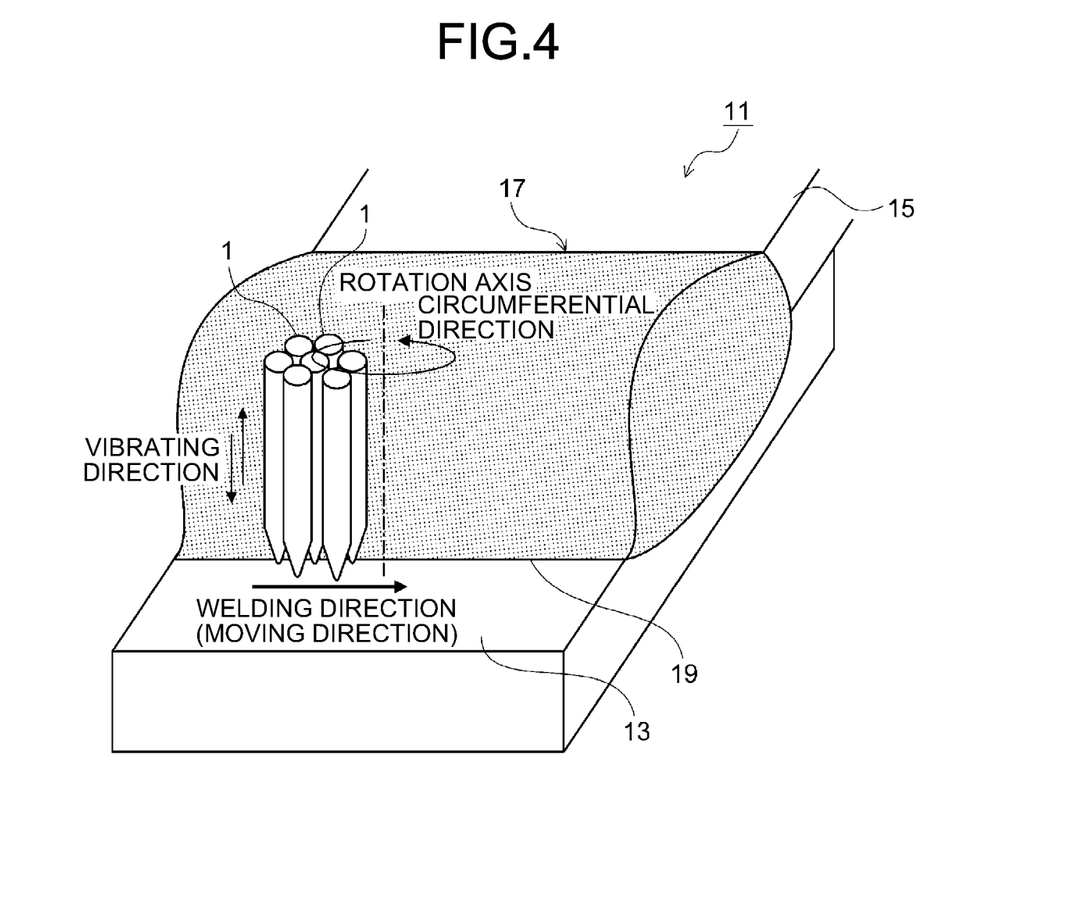
FIG. 4 is a diagram explaining another aspect of the needle-peening method according to the example (part 3).

FIG. 2 illustrates the three peening pins 1 arranged in a radial direction centered on the rotation axis, and FIG. 3 illustrates the three peening pins 1 arranged in a circumferential direction centered on the rotation axis. FIG. 4 illustrates the peening pins 1 bundled at a position offset from the rotation axis.

Figure 5A:
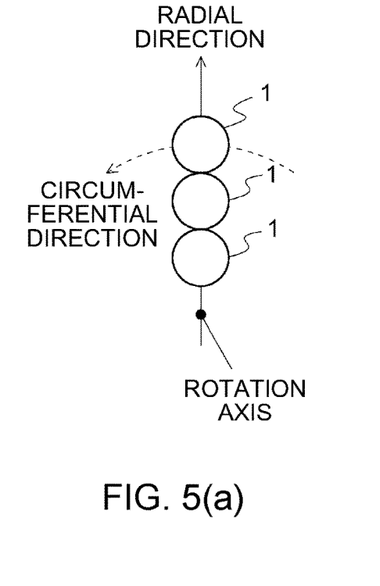
Figure 5B:
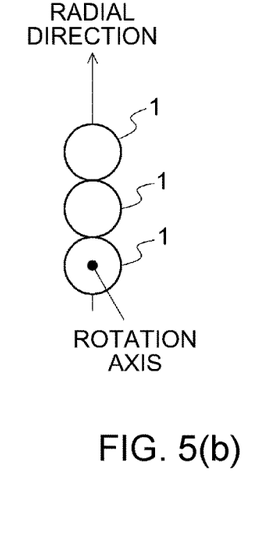
Figure 5C:
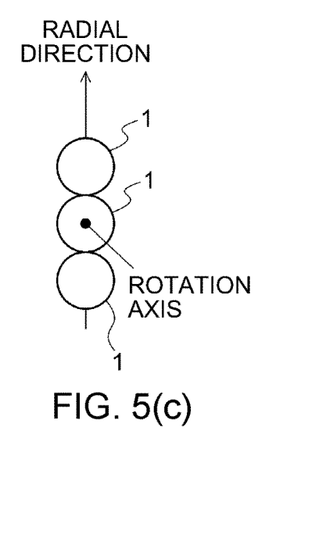
Figure 6A:
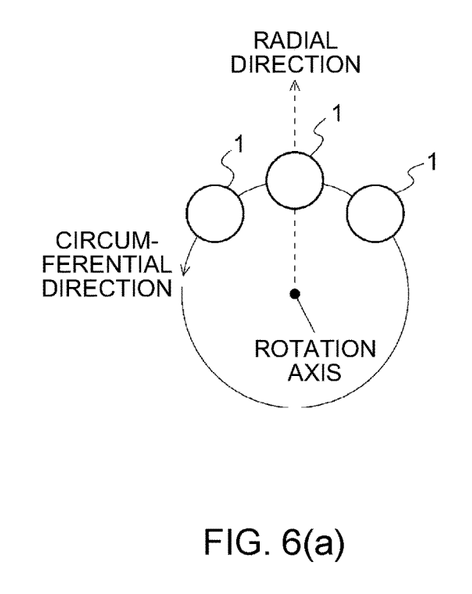
Figure 6B:
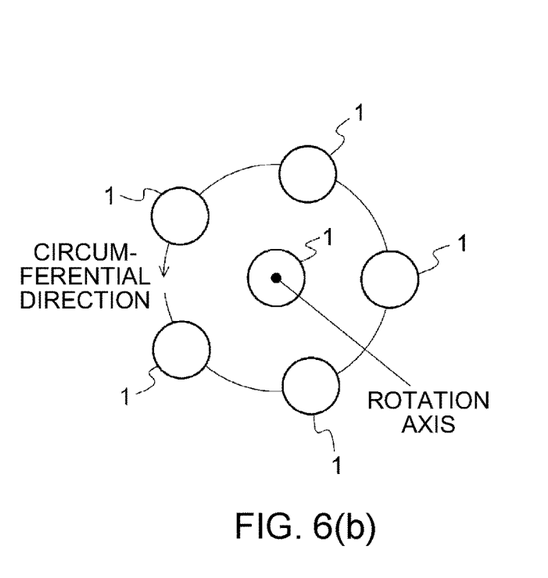

FIG. 5 illustrates a specific example of arrangement when the peening pins 1 are arranged in the radial direction centered on the rotation axis, and FIG. 6 illustrates a specific example of arrangement when the peening pins 1 are arranged in the circumferential direction centered on the rotation axis. In rotating the peening pins 1, as illustrated in FIGS. 2 to 4 described above, FIG. 5(a), and FIG. 6(a), the rotation axis is not required to be offset from center axes of all of the peening pins 1. As illustrated in FIGS. 5(b), (c), and FIG. 6(b), the rotation axis may agree with the center axis of any one of the peening pins 1.

In this way, by arranging and rotating the peening pins 1 to perform peening, a peening area can be enlarged, and a peening speed can be increased without increasing the peening load applied to the peening pins 1. Additionally, as illustrated in FIG. 4, by rotating a bundle of the peening pins 1 at the same time, efficiency of peening can be further improved.

The shape of the distal end part 1a of the peening pin 1 is not limited so long as the radius of curvature of the cross section perpendicular to the welding direction is equal to or larger than 0.05 mm and smaller than 1.00 mm. As the shape of the distal end part 1a, for example, a hemispherical shape, a semi-elliptical shape, a semi-cylindrical shape, an abbreviated semi-cylindrical shape, and the like can be used.

The welded joint 11 in the above description is a lap fillet welded joint obtained by lap fillet welding of the two pieces of sheet metal 13 and 15. However, our methods not only apply to the weld toe of the lap fillet welded joint, but also may be applied to a fillet welding joint such as a T-joint or a cruciform joint, a butt welding joint and the like. A welding method for the welded joint is not limited to arc welding, and our methods can be applied to a weld toe formed by any welding method. Furthermore, material of the sheet metal used as the base metal of the welded joint is not limited so long as the sheet metal is a thin plate.

EXAMPLE

An experiment was performed to confirm a working effect. The following describes the experiment. In this example, needle-peening processing was performed, by using a peening pin that performs peening while being rotated, on a weld toe of a weld bead in a welded joint obtained by lap fillet arc welding of two steel sheets. Subsequently, fatigue specimens were taken from the welded joint subjected to the needle-peening processing and the welded joint not subjected to the needle-peening processing by comparison, and a plane bending fatigue test was performed to evaluate a fatigue strength. Specific procedures and conditions are described below.

Two steel sheets 23 and 25 (300×140 mm) were cut out from a hot-rolled steel sheet having a thickness of 2.9 mm and a tensile strength of 980 MPa grade. The steel sheets 23 and 25 were fixed by a jig, and subjected to lap fillet arc welding to make a welded joint 21 (refer to FIG. 7). Welding conditions are indicated by Table 1. A radius of curvature of a weld toe 29 of the welded joint 21 was in a range from 0.2 mm to 0.8 mm.

TABLE 1

| Shielding gas | Current (A) | Voltage (V) | Welding speed (cm/min) |
|---|---|---|---|
| 80%Ar—20%CO$_2$ | 230 | 23 | 80 |

Figure 7:
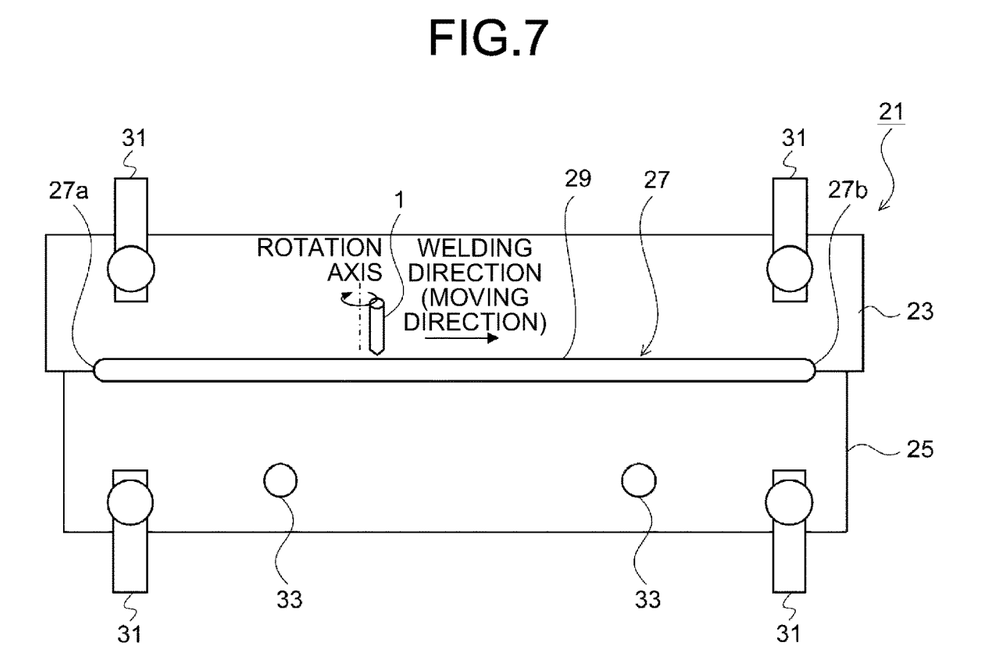
FIG. 7 is a diagram explaining processing using the needle-peening method in an example.

In this example, the needle-peening processing was performed by using a procedure described below. First, as illustrated in FIG. 7, the welded joint 21 including positioning pin holes 33 was fixed by jigs 31. The peening pin 1 was vibrated by an electromagnetic tool disposed at a distal end of a robot arm (not illustrated), and the peening pin 1 was moved along a welding direction of the welded joint 21 while being rotated.

In moving the peening pin 1 by the robot arm, first, the welded joint 21 as the first one was used, and teaching was performed for the robot arm assuming that a welding start part 27a of a weld bead 27 was a peening process start position, and a welding end part 27b was a peening process end position.

Next, based on the teaching, the first welded joint 21 was subjected to the needle-peening processing. Subsequently, the first welded joint 21 was replaced with the welded joint 21 as the second one, and the needle-peening processing was performed under the conditions used for the teaching for the first welded joint 21. By repeating this work, five welded joints 21 in total were made with the same welding conditions and needle-peening conditions.

In this way, four fatigue specimens were taken from each of the one welded joint 21 subjected to the needle-peening processing and the welded joint not subjected to the needle-peening processing by comparison, and a plane bending fatigue test was performed. Fatigue test conditions were set so that a repetition frequency was 15 Hz, and a stress ratio (a ratio between a minimum value and a maximum value of a stress loaded on the fatigue specimen) was 0 (pulsating). The number of cycles of loading the stress until a fatigue crack was caused in the fatigue specimen was measured, and the test was finished when the number of cycles reaches 3×10$^6$, which was assumed to be a fatigue limit.

First Example, Influence of Offset from Rotation Axis and Rotation Speed

The needle-peening processing was performed on the weld toe 29 of the made welded joint 21 by vibrating, by an electromagnetic tool at 100 Hz, the one peening pin 1 including the distal end part 1a in which the radius of curvature of the cross section perpendicular to the welding direction was 0.3 mm. Needle-peening processing conditions are indicated by Table 2.

TABLE 2

| No. | Moving speed (cm/min) | Radius of gyration (offset distance) (mm) | Rotation speed (times/s) | Remarks |
|---|---|---|---|---|
| 1 | 80 | 2 | 7.5 | Example |
| 2 | 80 | 2 | 12 | Example |
| 3 | 80 | 1.5 | 12 | Example |
| 4 | 80 | 0 | — | Comparative example |

In Table 2, No. 1 to No. 3 are related to the needle-peening processing conditions according to an example, and a moving speed, a radius of gyration (an offset distance between the center axis of the peening pin 1 and the rotation axis), and a rotation speed of the one peening pin 1 are changed. No. 4 indicates the needle-peening processing conditions for peening the weld toe without causing the one peening pin to be offset or rotated by comparison.

Figure 8:
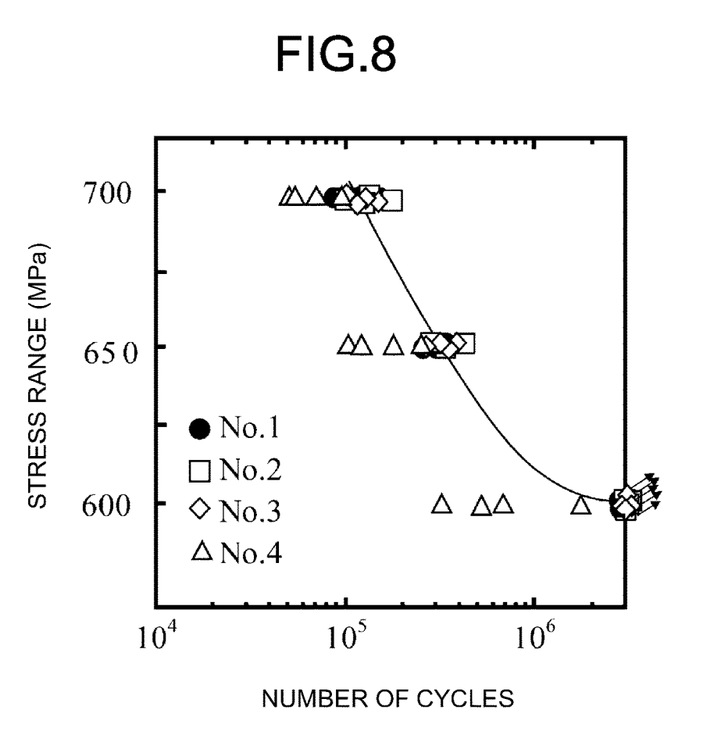
FIG. 8 is a graph illustrating a fatigue test result in the example.

FIG. 8 illustrates a fatigue test result. In FIG. 8, a horizontal axis indicates the number of cycles at which a repeated stress is loaded on the fatigue specimen to cause the fatigue crack (fatigue life), and a vertical axis indicates a range of the stress to be loaded (a difference between a maximum stress and a minimum stress (0 MPa)). In No. 4 according to a comparative example in which peening was performed without causing the peening pin to be offset or rotated, obtained was a result in which variation in the fatigue life was huge. In contrast, in No. 1 to No. 3 according to an example, a favorable result was obtained such that substantially the same fatigue life was found in each stress range, and the fatigue life was longer than that of the comparative example in any stress range.

Second Example, Influence of Radius of Curvature of Distal End Part of Peening Pin Next, in the welded joint that was made under the welding conditions indicated by Table 1, the three peening pins illustrated in FIG. 5(a) were arranged in the radial direction centered on the rotation axis, the radius of curvature of the distal end part of the peening pin was changed to perform the plane bending fatigue test for the fatigue specimen subjected to the needle-peening processing, and the fatigue life was evaluated. In the needle-peening processing, it was assumed that the number of vibrations of the peening pin was 100 Hz, the moving speed was 80 cm/min, the radius of gyration (an offset distance between the rotation axis and the center axis of the peening pin closest to the rotation axis) was 2 mm, and the rotation speed was 7.5 times/s, and the radius of curvature of the cross section perpendicular to the welding direction at the distal end part of the peening pin was changed in a range from 0.03 mm to 1.00 mm.

Assuming that the repetition frequency was 15 Hz, a load stress range was 650 MPa, and the stress ratio was 0 (pulsating), the number of cycles of loading the stress until the fatigue crack was caused in the fatigue specimen was measured, and the number of cycles of 3×10$^6$ was assumed to be the fatigue limit. Additionally, the cross section perpendicular to the welding direction of the weld toe after being subjected to the needle-peening processing was photographed, and presence/absence of generation of an overlapping defect due to peening by the peening pin and wear of the distal end part of the peening pin due to peening were observed and evaluated. Table 3 indicates the radius of curvature of the distal end part of the peening pin, generation of the overlapping defect, wear of the distal end part of the peening pin, and an evaluation result obtained by integrating these items.

TABLE 3

| No. | Radius of curvature of distal end part of peening pin (mm) | Overlapping defect | Wear of distal end part of peening pin | Overall evaluation | Remarks |
|---|---|---|---|---|---|
| 11 | 0.03 | Absent | Much | X | Comparative example |
| 12 | 0.05 | Absent | Little | ○ | Example |
| 13 | 0.50 | Absent | Little | ○ | Example |
| 14 | 0.80 | Absent | Little | ○ | Example |
| 15 | 0.94 | Absent | Little | ○ | Example |

According to Table 3, in No. 11 according to the comparative example, the radius of curvature of the distal end part was 0.03 mm, and the overlapping defect was not caused at the weld toe. However, peening could not be sufficiently performed along the welding direction because wear of the distal end part was hard so that the fatigue specimen to be used for the fatigue test could not be taken.

In No. 16 according to the comparative example, the radius of curvature of the distal end part was 1.00 mm, which was larger than the radius of curvature of the weld toe so that the overlapping defect was caused at the weld toe.

In contrast, in No. 12 to No. 15 in which the radius of curvature of the distal end part falls within our range, the overlapping defect was not caused at the weld toe, and a degree of wear of the distal end part of the peening pin was sufficiently low and favorable.

Figure 9:
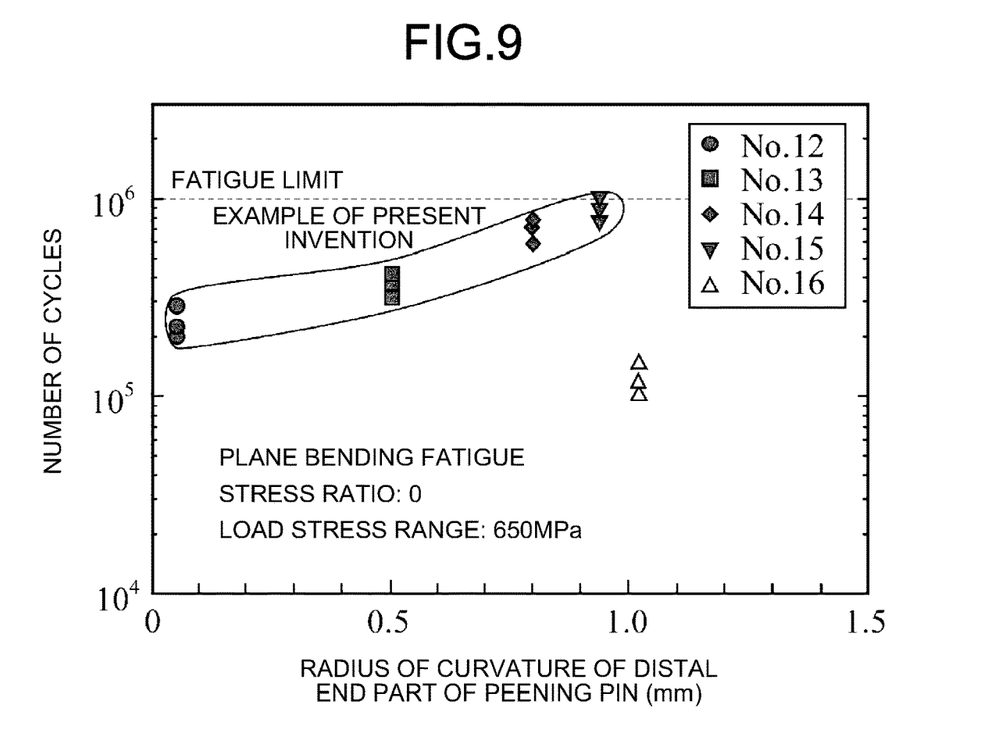
FIG. 9 is a graph illustrating a relation between a radius of curvature of a distal end part of the peening pin and the number of cycles.

FIG. 9 illustrates a result of the fatigue life of the fatigue specimen on which the needle-peening processing is performed by the peening pin including the distal end part having the radius of curvature indicated by Table 3.

As described above, in No. 11 of Table 3, the needle-peening processing could not be continued because wear of the distal end part of the peening pin was hard so that a required number of fatigue specimens for evaluation could not be taken. In No. 16 according to the comparative example, the radius of curvature of the distal end part was 1.00 mm, which was larger than our preferable range so that the overlapping defect was caused at the weld toe, and the fatigue crack was caused at the number of cycles of about $1\times10^5$ to $1.4\times10^5$ as indicated by Table 3 described above.

In contrast, in No. 12 to No. 15 according to an example, a favorable result was obtained such that the fatigue life is the number of cycles of $2\times10^5$ to $10\times10^5$ compared to No. 16 according to the comparative example. A result was obtained such that, when the radius of curvature of the distal end part was increased in a range equal to or larger than 0.05 mm and smaller than 1.00 mm, the compressive residual stress working on a bottom of the peening mark formed by peening by the peening pin was increased so that the fatigue life tended to be further improved.

Third Example (Influence of Arrangement, Number, and Radius of Gyration of Peening Pin)

Furthermore, the needle-peening processing was performed on the welded joint that was made under the welding conditions indicated by Table 1 while causing the radius of curvature of the distal end part of the peening pin to be 0.3 mm, and changing the arrangement of the peening pins, the number of the peening pins, and the radius of gyration. The plane bending fatigue test was then performed on the fatigue specimen after being processed under conditions of the repetition frequency of 15 Hz, the load stress of 650 MPa, and the stress ratio of 0 (pulsating) to evaluate the fatigue life. In the needle-peening processing, it was assumed that the number of vibrations of the peening pin was 100 Hz, the moving speed was 80 cm/min, and the rotation speed was 7.5 times/s.

TABLE 4

| | Peening Pin | | | Result | | | |
|---|---|---|---|---|---|---|---|
| No. | Arrangement | Number | Radius of gyration (mm) (offset distance to center axis of peening pin closest to rotation axis) | Overlapping Defect | Fatigue life (average value of number of cycles) | Remarks | |
| 21 | Serial in radial direction of rotation axis | 3 | 2 | Absent | $3.0 \times 10^5$ | Example | FIG. 5(a) |
| 22 | Serial in radial direction of rotation axis | 5 | 1 | Absent | $3.2 \times 10^5$ | Example | FIG. 5(a) |
| 23 | Serial in radial direction of rotation axis | 3 | 0 (center axis of peening pin at end part) | Absent | $2.8 \times 10^5$ | Example | FIG. 5(b) |
| 24 | Serial in radial direction of rotation axis | 3 | 0 (center axis of peening pin at center) | Absent | $2.5 \times 10^5$ | Example | FIG. 5(c) |
| 25 | Circumferential direction of rotation axis | 6 | 5 (all peening pins are on circumference) | Absent | $3.2 \times 10^5$ | Example | FIG. 6(a) |
| 26 | Circumferential direction of rotation axis | 6 | 5 (one peening pin agrees with rotation axis, and others are on Circumference) | Absent | $3.0 \times 10^5$ | Example | FIG. 6(b) |

According to Table 4, the overlapping defect was not caused both in No. 21 to No. 24 in which the peening pins were arranged in the radial direction of the rotation axis, and in No. 25 and No. 26 in which the peening pins were arranged in the circumferential direction of the rotation axis.

A favorable result of the fatigue life was obtained such that an average value of the number of cycles was high in all of No. 21 to No. 26 according to an example compared to the average value of the number of cycles of about $1.5 \times 10^5$ in conventional No. 4 illustrated in FIG. 8 in which the peening pins were not rotated.

The fatigue life was almost the same in No. 21 to No. 23 among which the radius of gyration was changed, the radius of gyration as the offset distance between the rotation axis and the center axis of the peening pin closest to the rotation center, and a favorable result was obtained under any condition.

INDUSTRIAL APPLICABILITY

We provide a needle-peening method that can relieve stress concentration on a weld toe, and can prevent overlapping defects from being caused.

The invention claimed is:

1. A needle-peening method of peening a weld toe of a welded joint for welding and joining two pieces of sheet metal by using a plurality of peening pins, the method comprising:

vibrating the plurality of the peening pins in a center axis direction, wherein center axes of each of the plurality of the peening pins is parallel to each other;

rotating the plurality of the peening pins about one rotation axis parallel to the center axes of the plurality of the peening pins while at least one of the plurality of the peening pins is rotated about an offset rotation axis; and moving the plurality of the peening pins along a welding direction to peen the weld toe, wherein a radius of curvature of a cross section perpendicular to the welding direction at a distal end part of each of the plurality of the peening pins is equal to or larger than 0.05 mm and smaller than 1.00 mm.

2. The needle-peening method according to claim 1, wherein the plurality of the peening pins are arranged in a radial direction centered on the rotation axis.

3. The needle-peening method according to claim 1, wherein the plurality of the peening pins are arranged in a circumferential direction centered on the rotation axis.

4. The needle-peening method according to claim 2, wherein the plurality of the peening pins are arranged in a circumferential direction centered on the rotation axis.

5. The needle-peening method according to claim 1, wherein a portion toward a weld bead side and a base metal side from the weld toe as a center is peened at the moving.

* * * * *